(12) United States Patent
Astor et al.

(10) Patent No.: US 8,944,743 B2
(45) Date of Patent: *Feb. 3, 2015

(54) RAMP BOTTOM TRANSITION FOOT

(75) Inventors: Kyle G. Astor, Meadville, PA (US);
Brett A. Latimer, New Castle, PA (US);
Robert D. Beggs, Stoneboro, PA (US)

(73) Assignee: Werner Co., Greenville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,829

(22) Filed: Aug. 7, 2012

(65) Prior Publication Data

US 2012/0301266 A1 Nov. 29, 2012

Related U.S. Application Data

(63) Continuation of application No. 11/827,503, filed on Jul. 12, 2007, now Pat. No. 8,256,053.

(51) Int. Cl.
*B60P 1/43* (2006.01)

(52) U.S. Cl.
USPC ............................... 414/537; 296/61; 14/69.5

(58) Field of Classification Search
USPC ............................... 414/537; 296/61; 14/69.5
See application file for complete search history.

(56) References Cited

U.S. PATENT DOCUMENTS

| 653,942 | A | * | 7/1900 | Willis et al. ................ 280/32 |
|---|---|---|---|---|
| 1,210,133 | A | * | 12/1916 | Baker ........................... 14/69.5 |
| 3,173,398 | A | * | 3/1965 | Raymond ................... 119/28.5 |
| 3,355,037 | A | * | 11/1967 | Dodd .......................... 414/373 |
| 3,984,891 | A | * | 10/1976 | Weinmann ................... 14/69.5 |
| 4,222,698 | A | | 9/1980 | Boelter |
| 4,235,399 | A | | 11/1980 | Shorey |
| 4,715,769 | A | | 12/1987 | Kirtley |
| 4,727,612 | A | | 3/1988 | Smith |
| 4,729,712 | A | | 3/1988 | Corley, Jr. |
| 4,761,847 | A | | 8/1988 | Savage et al. |
| 4,779,298 | A | * | 10/1988 | Nichols et al. ............... 14/69.5 |
| 4,853,999 | A | | 8/1989 | Smith |
| 4,874,284 | A | | 10/1989 | New, Jr. |
| 4,979,867 | A | | 12/1990 | Best |
| 5,066,188 | A | | 11/1991 | Bush |
| 5,096,362 | A | | 3/1992 | Best |
| 5,133,634 | A | | 7/1992 | Gingrich et al. |
| 5,145,310 | A | * | 9/1992 | Calzone ....................... 414/537 |
| 5,169,202 | A | | 12/1992 | Cupp et al. |
| 5,211,437 | A | | 5/1993 | Gerulf |
| 5,215,426 | A | | 6/1993 | Bills, Jr. |
| 5,273,335 | A | | 12/1993 | Belnap et al. |
| 5,440,773 | A | * | 8/1995 | Lentini ......................... 14/69.5 |
| 5,538,308 | A | | 7/1996 | Floe |

(Continued)

FOREIGN PATENT DOCUMENTS

GB 2259494 3/1993

*Primary Examiner* — Jonathan Snelting
(74) *Attorney, Agent, or Firm* — Ansel M. Schwartz

(57) ABSTRACT

An apparatus for wheeling a vehicle onto a truck or trailer includes a ramp. The apparatus includes a mounting portion attached to the ramp that mounts to the truck or trailer. The apparatus includes a transition piece the pivotally attaches to the ramp and contacts ground when the mounting portion is mounted to the truck or trailer. A method for placing a vehicle onto a truck or trailer includes the steps of attaching a mounting portion of a ramp to the truck or trailer. There is the step of moving a transition piece attached to the ramp so the transition piece contacts ground. There is the step of wheeling the vehicle across the transition piece, up the ramp and onto the truck or trailer.

6 Claims, 8 Drawing Sheets

(56) References Cited

U.S. PATENT DOCUMENTS

| | | | |
|---|---|---|---|
| 5,553,989 | A | 9/1996 | Ullman |
| 5,645,394 | A | 7/1997 | Hays |
| 5,921,742 | A | 7/1999 | Gearhart |
| 5,926,889 | A | 7/1999 | Riesselmann et al. |
| 5,938,397 | A | 8/1999 | Schouest |
| 5,988,725 | A * | 11/1999 | Cole ............................. 296/61 |
| 6,059,344 | A | 5/2000 | Radosevich |
| 6,139,249 | A * | 10/2000 | Lucht ............................ 414/537 |
| 6,186,734 | B1 | 2/2001 | Maurer |
| 6,430,769 | B1 * | 8/2002 | Allen ............................ 14/69.5 |
| 6,643,878 | B2 * | 11/2003 | Schmaltz et al. ............. 14/69.5 |
| 6,695,565 | B1 | 2/2004 | Franchuk |
| 6,695,707 | B1 * | 2/2004 | Fernandez et al. ............ 472/89 |
| 6,701,563 | B2 | 3/2004 | Schomaker et al. |
| 6,705,820 | B2 | 3/2004 | Schilling |
| 6,715,177 | B1 * | 4/2004 | Lagergren-Julander ....... 14/69.5 |
| 6,733,219 | B1 | 5/2004 | Floe |
| 6,837,669 | B2 * | 1/2005 | Reed et al. .................... 414/537 |
| 6,868,574 | B2 | 3/2005 | Schomaker et al. |
| 6,928,959 | B1 * | 8/2005 | Trauernicht et al. .......... 119/847 |
| 7,063,494 | B2 | 6/2006 | Smith, Jr. |
| 7,284,781 | B2 | 10/2007 | Grant |
| 7,316,043 | B2 * | 1/2008 | Henblad et al. ............... 14/69.5 |
| 7,350,255 | B2 * | 4/2008 | Zhang ........................... 14/69.5 |
| 7,350,843 | B2 * | 4/2008 | Meyers et al. ................. 296/50 |
| 7,448,104 | B2 * | 11/2008 | Turner .......................... 14/69.5 |
| 7,526,826 | B2 * | 5/2009 | Bailie ........................... 14/69.5 |
| 7,637,518 | B2 * | 12/2009 | Adair .......................... 280/164.1 |
| 8,256,053 | B2 * | 9/2012 | Astor et al. .................... 14/69.5 |
| 2001/0031194 | A1 | 10/2001 | Smith, Jr. |
| 2002/0031422 | A1 | 3/2002 | Schilling |
| 2002/0088065 | A1 * | 7/2002 | Schmaltz et al. ............. 14/69.5 |
| 2003/0039534 | A1 | 2/2003 | Radosevich et al. |

\* cited by examiner

RAMP BOTTOM TRANSITION FOOT

CROSS-REFERENCE TO RELATED APPLICATIONS

This is a continuation of U.S. patent application Ser. No. 11/827,503 filed Jul. 12, 2007 now U.S. Pat. No. 8,256,053, incorporated by reference herein.

FIELD OF THE INVENTION

The present invention is related to an apparatus for wheeling a vehicle onto a truck or trailer that has a transition piece that moves about a tube of a ramp. More specifically, the present invention is related to an apparatus for wheeling a vehicle onto a truck or trailer that has a transition piece that moves about a tube of a ramp by a top portion of the piece pivoting about the tube and a bottom portion which is arched and extends from the top portion to ground when the ramp is mounted by a mounting portion to the truck or trailer.

BACKGROUND OF THE INVENTION

Many different types of truck and trailer ramps exist in the market. Most of these ramps have little or no bottom transition from the bottom of the ramp to the ground. When pushing an ATV or garden tractor up the ramp, the user must exert enough force to get over this bump. A fixed straight piece of metal secured to the bottom of the ramp is a common solution for these applications. The fixed piece does not allow for different truck and trailer heights. The proposed pivoting foot is designed for a smoother transition from the ground to the ramp that can be used for virtually any truck or trailer height.

Most ramps have no transition on the bottom; the side rails rest on the ground. Some truck ramps have a fixed "L" shaped piece welded to the bottom of the ramp. This piece lessens the gap between the top surface of the ramp and the ground.

BRIEF SUMMARY OF THE INVENTION

The present invention pertains to an apparatus for wheeling a vehicle onto a truck or trailer. The apparatus comprises a ramp. The apparatus comprises a mounting portion attached to the ramp that mounts to the truck or trailer. The apparatus comprises a transition piece that pivotally attaches to the ramp and contacts ground when the mounting portion is mounted to the truck or trailer.

The present invention pertains to a method for placing a vehicle onto a truck or trailer. The method comprises the steps of attaching a mounting portion of a ramp to the truck or trailer. There is the step of moving a transition piece attached to the ramp so the transition piece contacts ground. There is the step of wheeling the vehicle across the transition piece, up the ramp and onto the truck or trailer.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
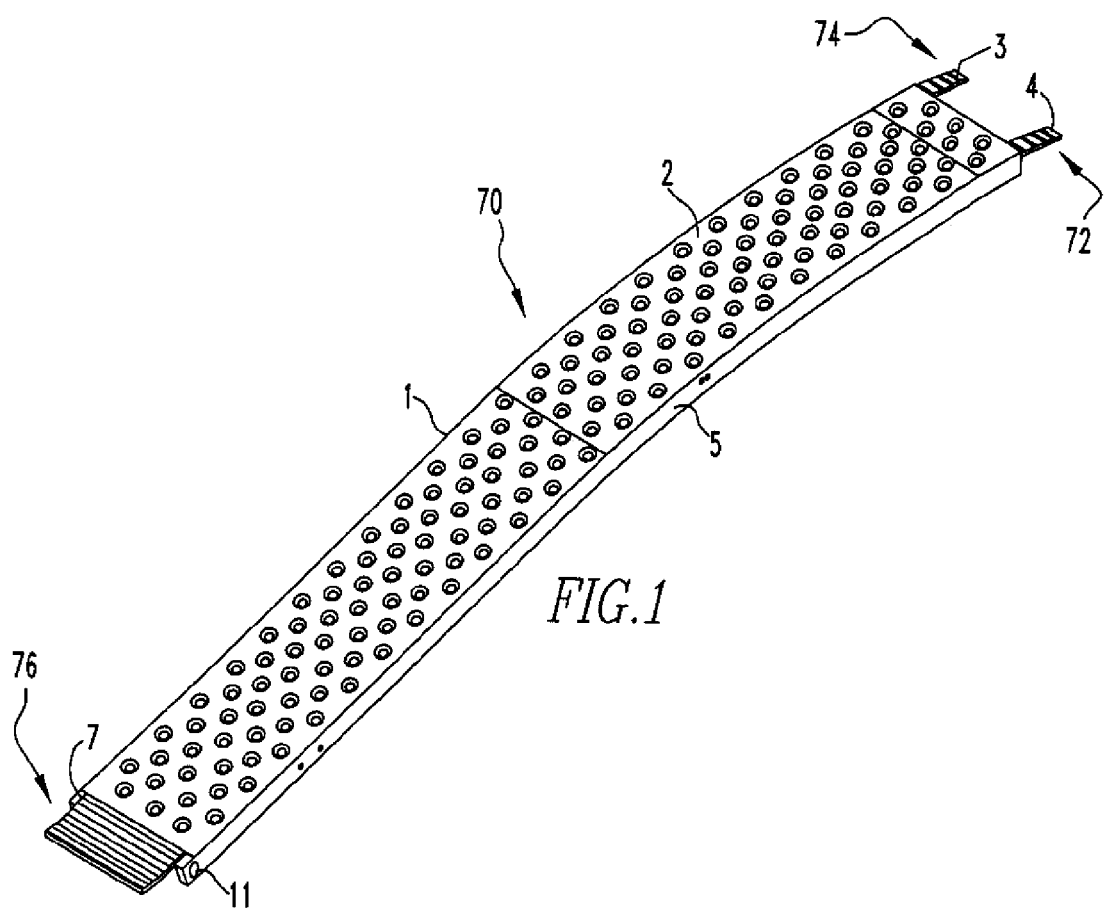
FIG. 1 is a perspective overhead view of an apparatus of the present invention.

Referring now to the drawings wherein like reference numerals refer to similar or identical parts throughout the several views, and more specifically to FIG. 1 thereof, there is shown an apparatus 70 for wheeling a vehicle onto a truck or trailer. The apparatus 70 comprises a ramp 1. The apparatus 70 comprises a mounting portion 72 attached to the ramp 1 that mounts to the truck or trailer. The apparatus 70 comprises a transition piece 7 that pivotally attaches to the ramp 1 and contacts ground 13 when the mounting portion 72 is mounted to the truck or trailer.

Figure 2:
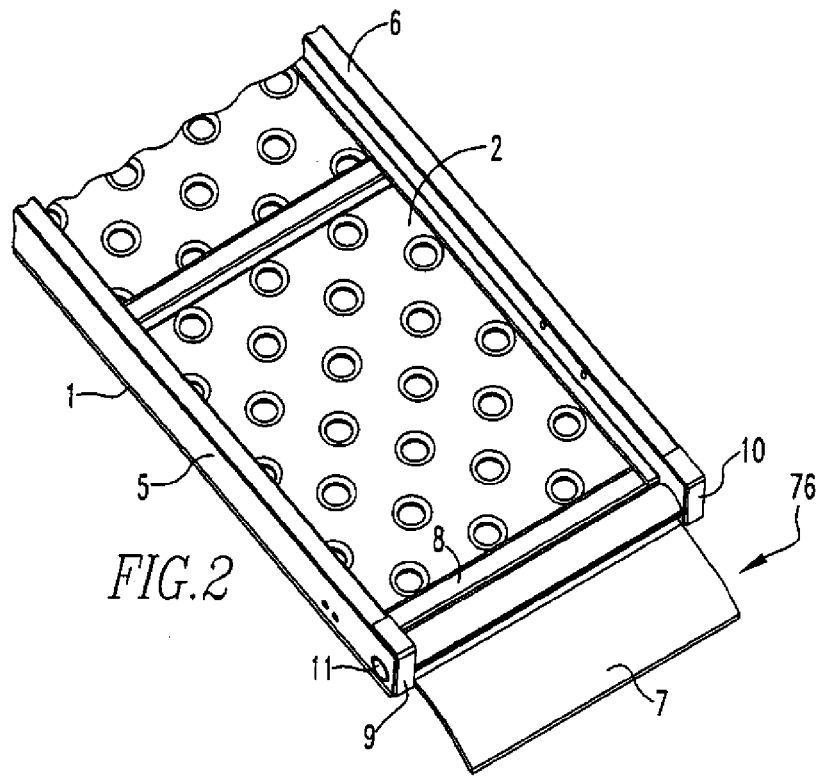
FIG. 2 is a perspective underside view of the lower portion of the apparatus.
Figure 3:
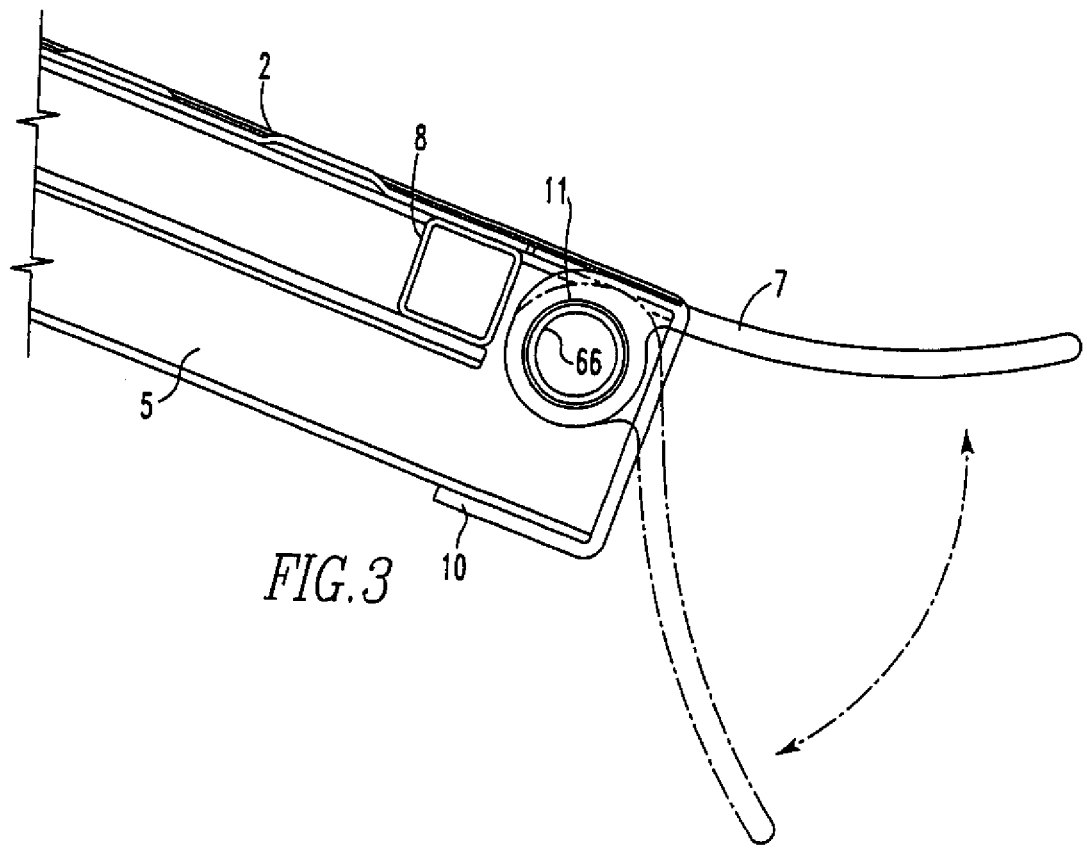
FIG. 3 is a side view of the lower portion of the apparatus.

Preferably, the ramp 1 includes a pivot member 11 about which the transition piece 7 pivots, as shown in FIG. 2. The transition piece 7 is preferably curved. Preferably, the transition piece 7 includes a top portion 74 which is positioned about the tube to pivot about the tube, as shown in FIG. 3. The transition piece 7 preferably includes a bottom portion 76 which is arched and extends from the top portion 74 to ground 13.

Figure 6:
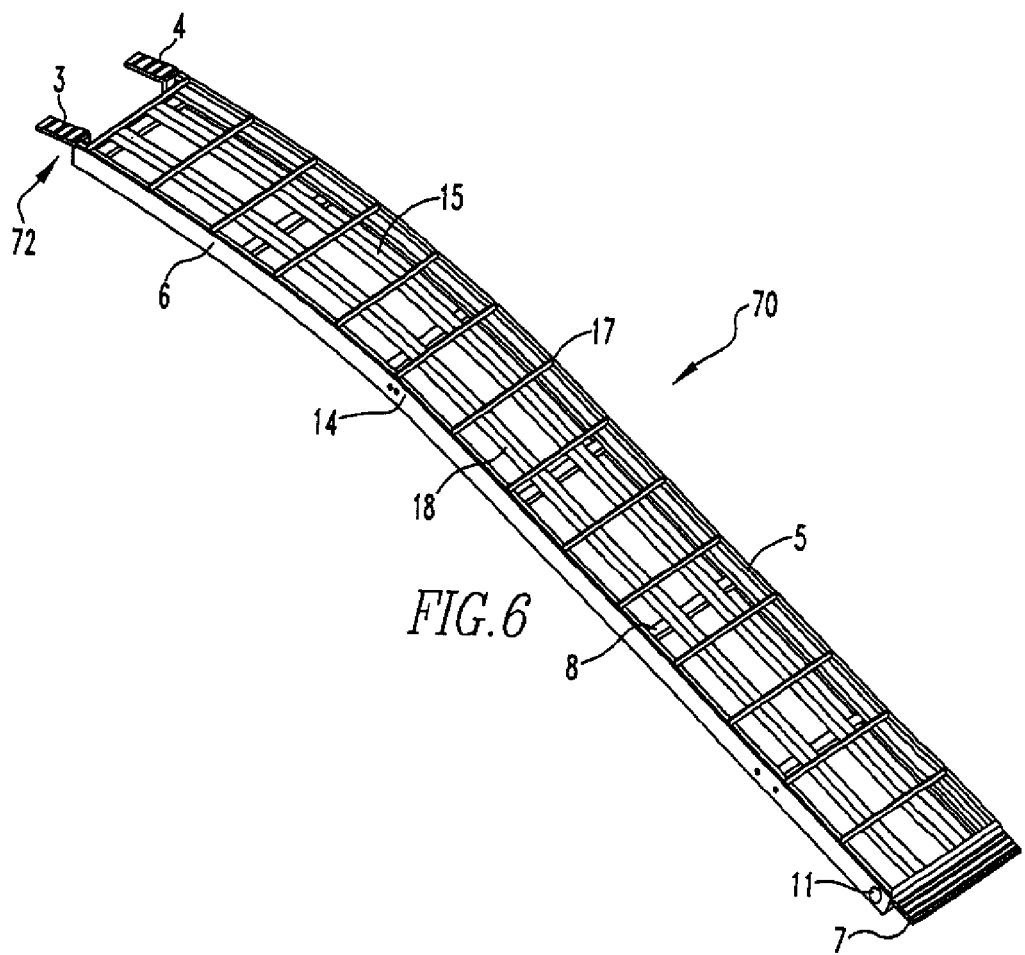
FIG. 6 is a perspective overhead view of another embodiment of the apparatus.
Figure 8:
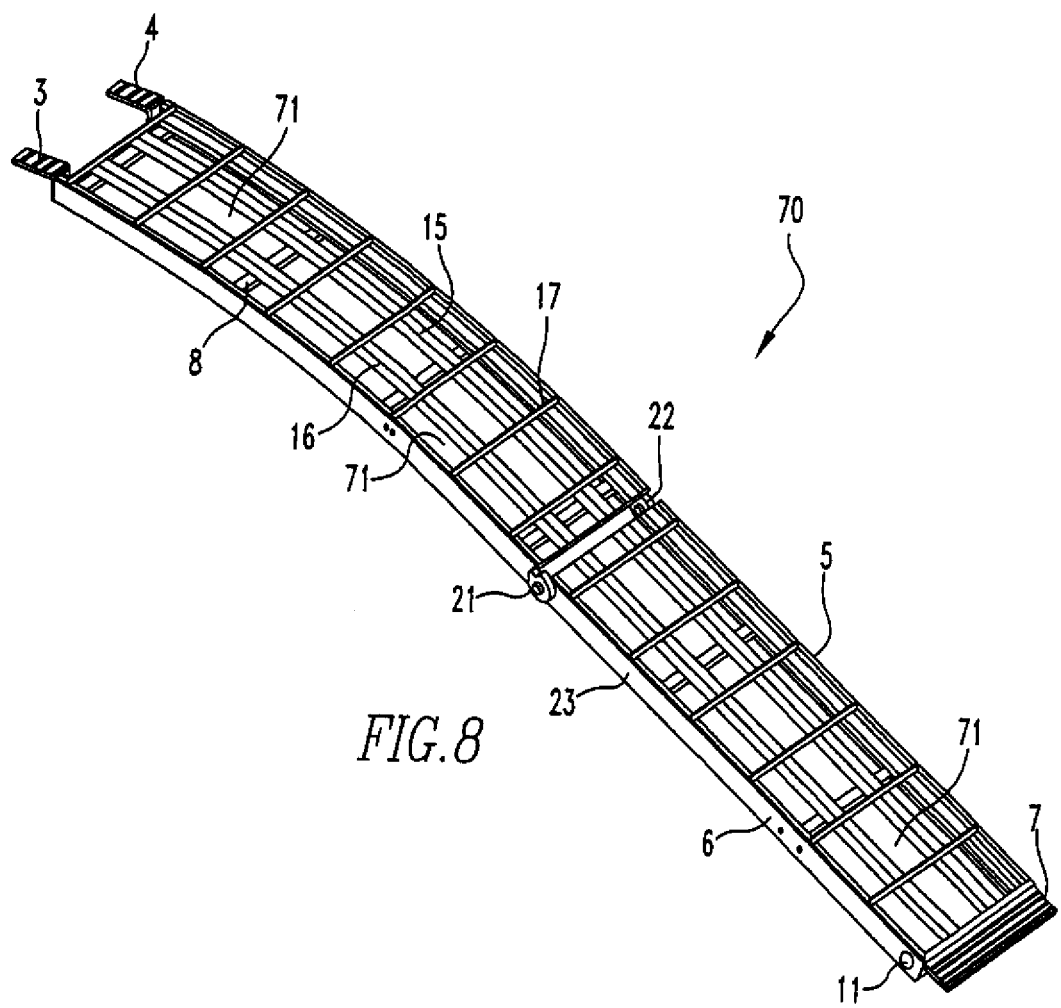
FIG. 8 is a perspective overhead view of another embodiment of the apparatus which folds.

Preferably, the ramp 1 includes a right side rail 5 and a left side rail 6. The ramp 1 preferably includes cross braces 8, as shown in FIG. 6. Preferably, the ramp 1 is arched. The ramp 1 preferably folds, as shown in FIG. 8. Preferably, the ramp 1 supports a load of at least 150 lbs. The ramp 1 preferably supports a load of at least 500 lbs. Preferably, the ramp 1 supports a load of at least 1000 lbs. Preferably, the mounting portion 72 includes fingers.

The present invention pertains to a method for placing a vehicle onto a truck or trailer. The method comprises the steps of attaching a mounting portion 72 of a ramp 1 to the truck or trailer. There is the step of moving a transition piece 7 attached to the ramp 1 so the transition piece 7 contacts ground 13. There is the step of wheeling the vehicle across the transition piece 7, up the ramp 1 and onto the truck or trailer.

Preferably, the moving step includes the step of pivoting the transition piece 7 about a pivot member 11 of the ramp 1. The wheeling step preferably includes the step of wheeling the vehicle across the transition piece 7 which is curved. Preferably, the pivoting step includes the step of rotating a top portion 74 of the transition piece 7 about the tube. The rotating step preferably includes the step of rotating the top portion 74 about the tube and a bottom portion 76 which is arched and extends from the top portion 74 to ground 13.

Preferably, the ramp 1 includes a right side rail 5 and a left side rail 6. The ramp 1 preferably includes cross braces 8. Preferably, the ramp 1 is arched. There is preferably the step of folding the ramp 1.

Preferably, the wheeling step includes the step of wheeling the vehicle which weighs at least 150 lbs. across the transition piece 7, up the ramp 1 and onto the truck or trailer. The wheeling step preferably includes the step of wheeling the vehicle which weighs at least 500 lbs. across the transition piece 7, up the ramp 1 and onto the truck or trailer. Preferably, the wheeling step includes the step of wheeling the vehicle which weighs at least 1000 lbs. across the transition piece 7, up the ramp 1 and onto the truck or trailer.

Figure 4:
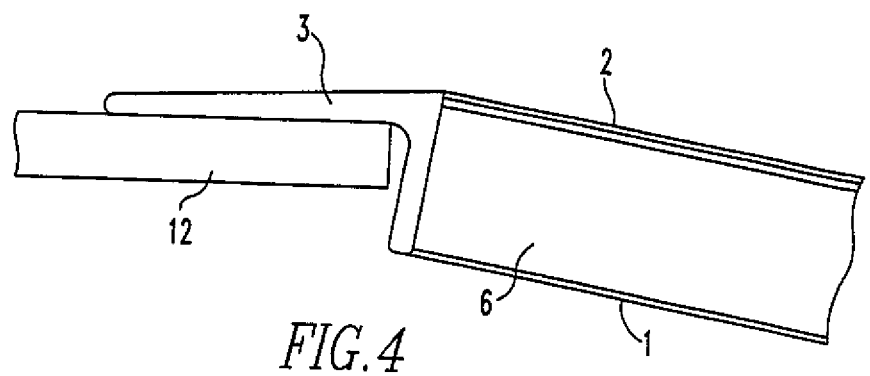
FIG. 4 is a side view of the upper portion of the apparatus mounted onto a truck or trailer.

The ramp 1, as shown in FIG. 1, has a right side rail 5 and left side rail 6. Cross braces 8, as shown in FIG. 2, connect the two rails 5 and 6. Fingers 3 and 4 are connected to the respective side rails 5 and 6. The fingers 3 and 4 engage the loading surface 12, as shown in FIG. 4. End guards 9 and 10 cap off the open ends of the ramp 1 so dirt and other material does not get lodged in the side rails 5 and 6. Decking 2 fastened to the top surface of the side rails 5 and 6 completes the basic structure of the ramp 1.

Figure 5:
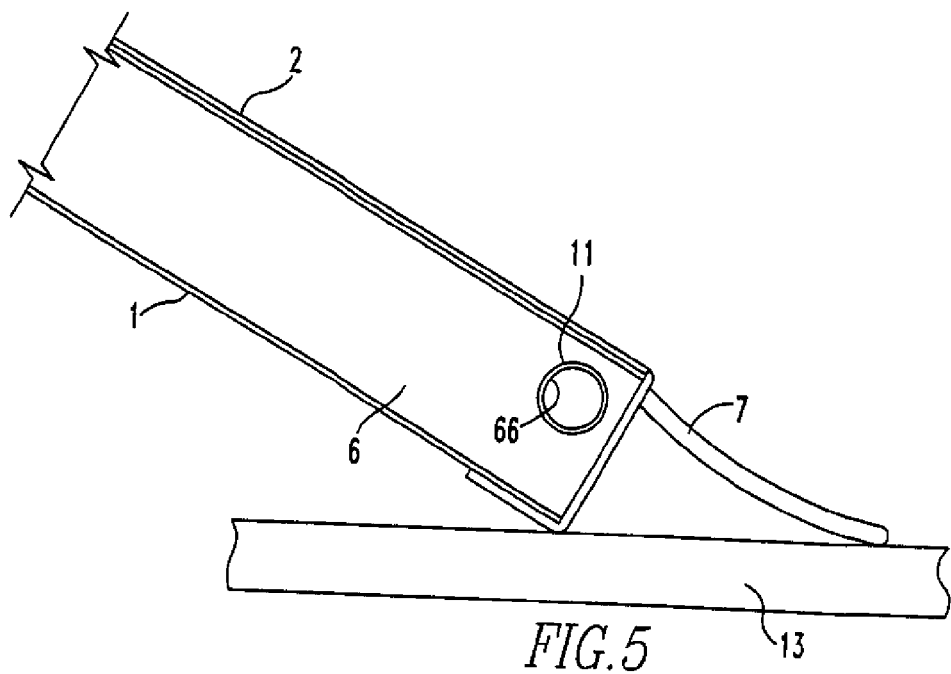
FIG. 5 is a side view of the lower portion.

The bottom transition piece 7 is shown in FIG. 2. The transition piece 7 rotates about the pivot member 11 which is connected to both side rails 5 and 6. The pivot member 11 allows the transition piece 7 to move freely, as shown in FIG. 3. Once the ramp 1 is set up on the loading surface 12, as shown in FIG. 4, the bottom transition piece 7 can rotate into place resting on the ground 13, as shown in FIG. 5.

Ramp 14, as shown in FIG. 6, is another ramp design with a bottom pivoting transition piece 7. This ramp 14 has a left rail 6 and a right rail 5 along with a right center rail 15 and a left center rail 16. Cross braces 8 connect the two rails 5 and 6. Cross treads 17 are positioned along the top surface for traction. This ramp also has a right finger 4 and left finger 3 to engage the loading surface.

Figure 7:
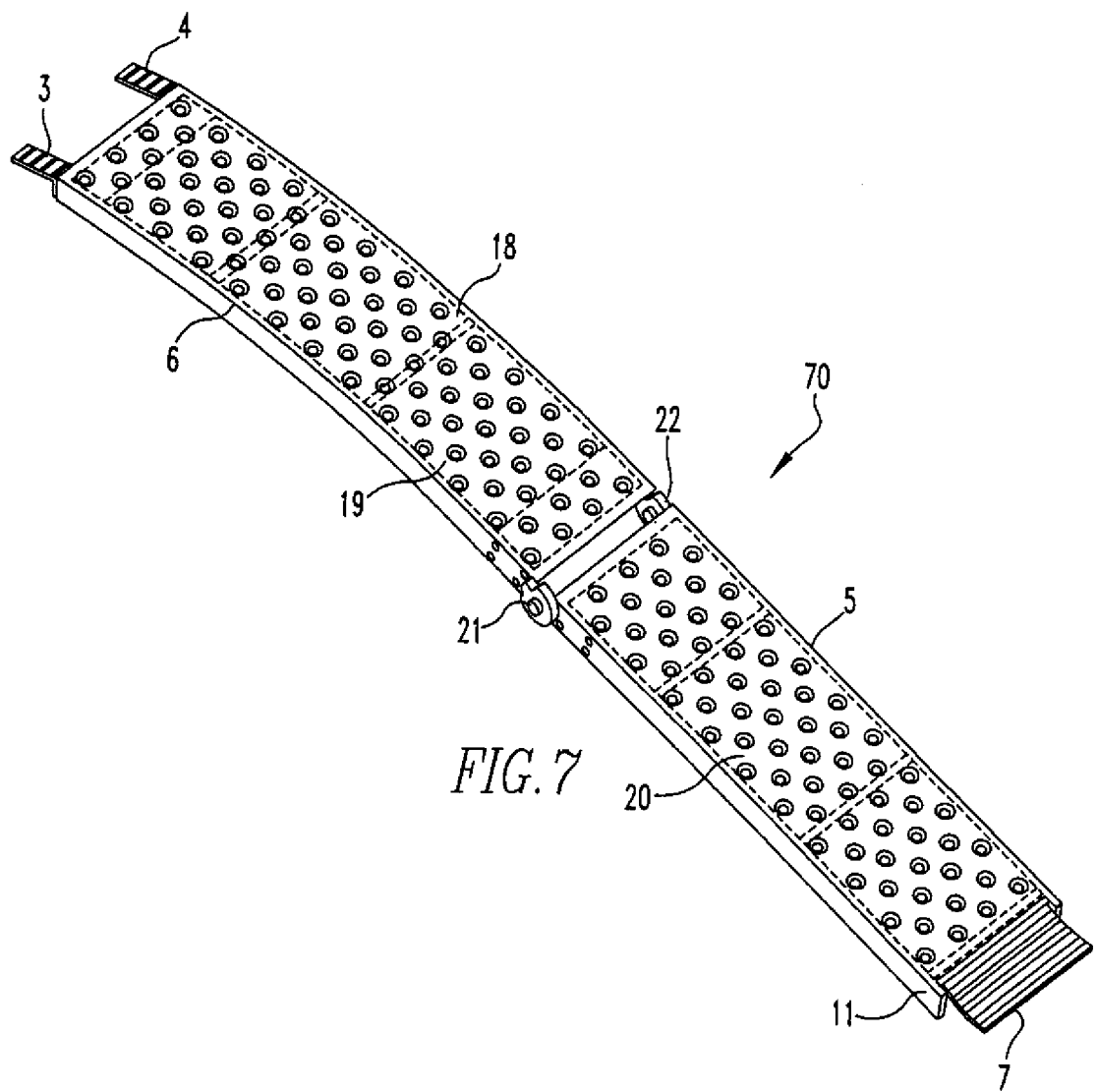
FIG. 7 is a perspective overhead view of another embodiment of the apparatus which folds.

Ramp 18, as shown in FIG. 7, is a folding ramp with solid decking 19 and 20 with the bottom pivoting transition piece 7. The ramp has a right rail 5 and a left rail 6 and a right finger 4 and left finger 3 for engaging the loading surface. The right hinge 22 and left hinge 21 allow the ramp to be folded for storage.

Ramp 23, as shown in FIG. 8, is a folding arched ramp. The ramp has a right rail 5 and a left rail 6 along with a right center rail 15 and a left center rail 16. Cross braces 8 connect the two rails 15 and 16. Treads 17 along the top of the ramp 23 provide traction. The ramp 23 has a pivot member 11 which allows the bottom transition piece 7 to rotate. The right hinge 22 and left hinge 21 allow the ramp to be folded for storage. The ramp also has a right finger 4 and left finger 3 to engage the loading surface.

Figure 9:
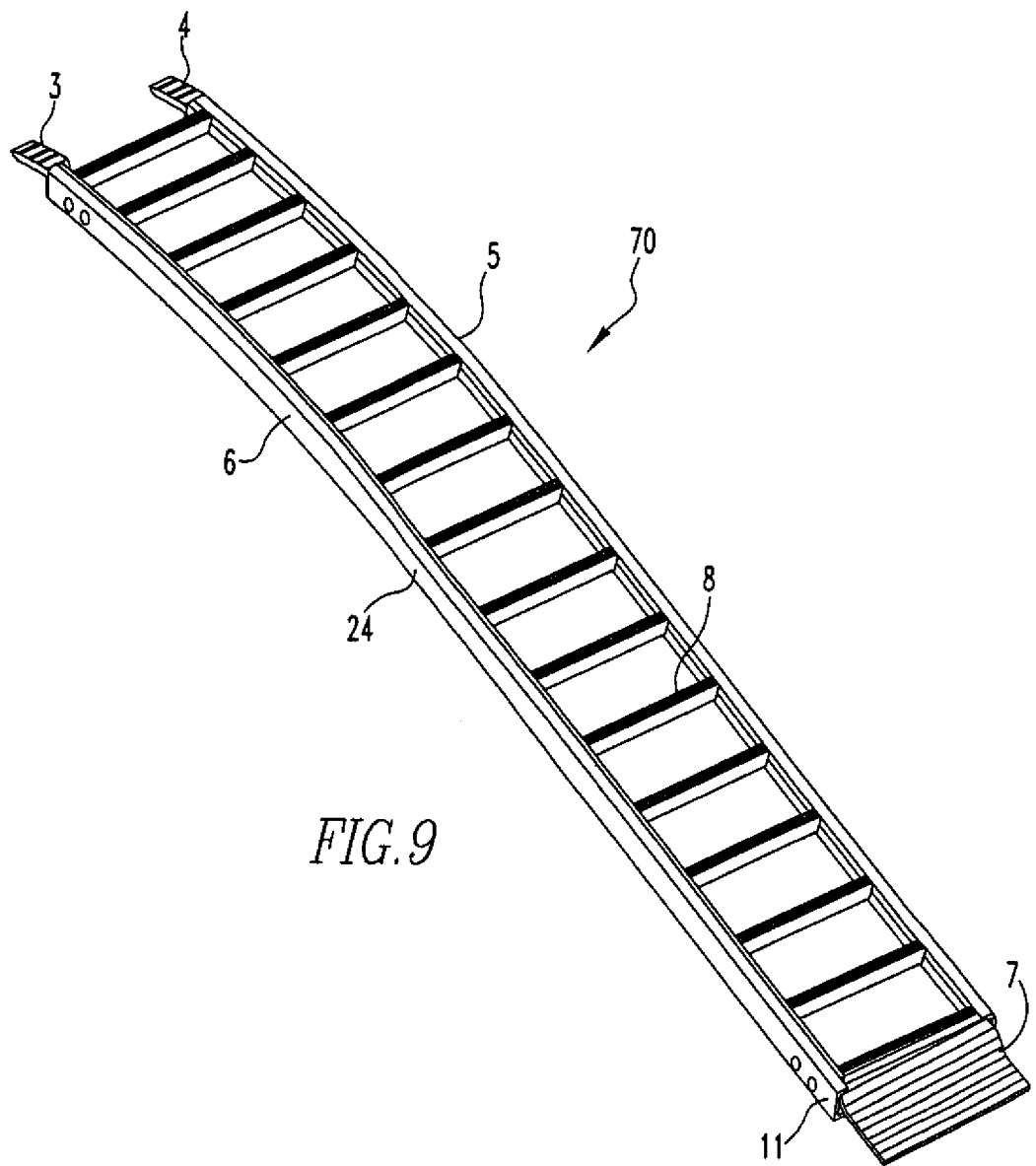
FIG. 9 is a perspective overhead view of another embodiment of the apparatus.

Ramp 24, as shown in FIG. 9, is an arched ramp. The ramp has a right rail 5 and a left rail 6. Cross braces 8 connect the right 5 and left 6 rails together. The ramp 24 has a pivot member 11 which the bottom transition piece 7 rotates. The ramp also has a right finger 4 and left finger 3 to engage the loading surface.

Figure 10:
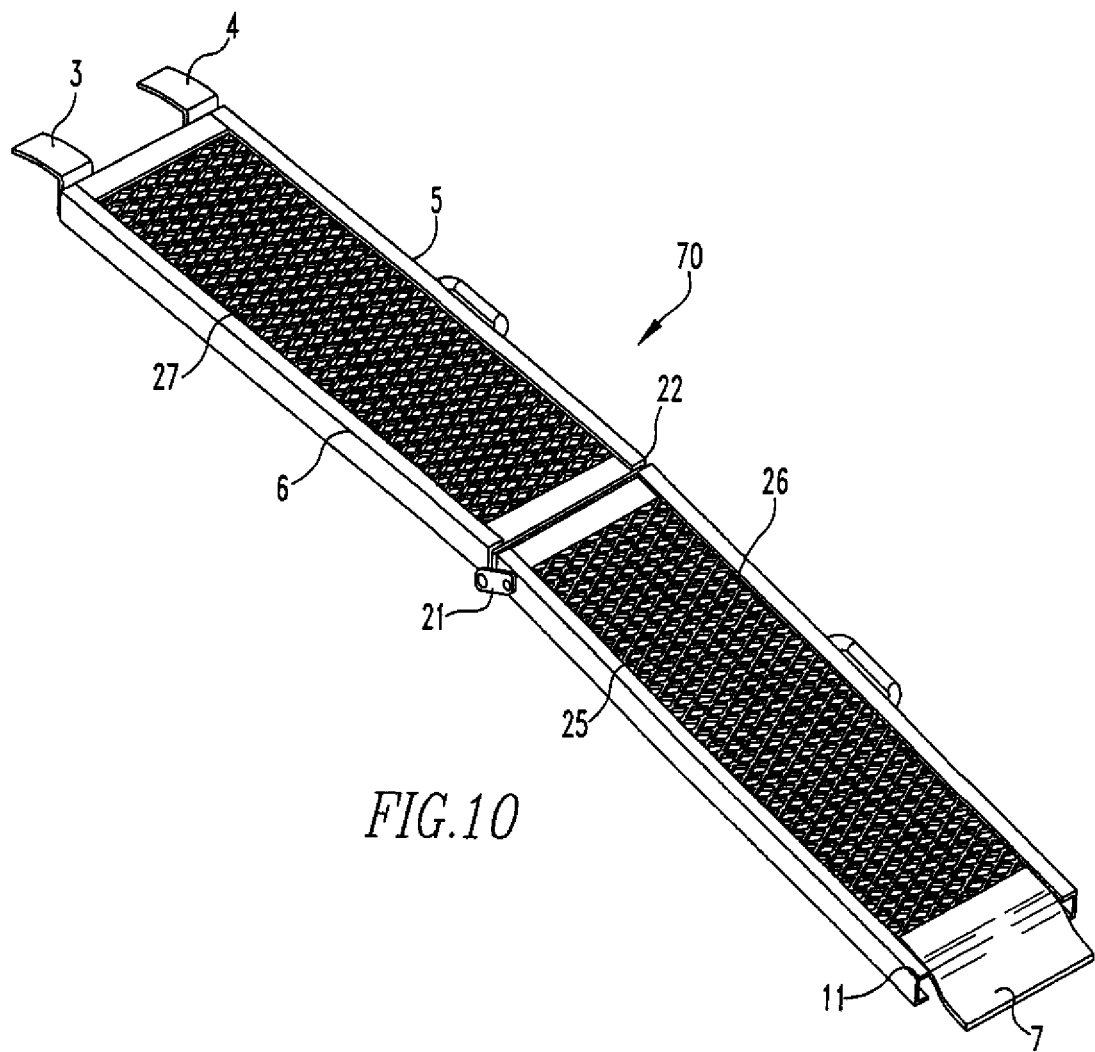
FIG. 10 is a perspective overhead view of another embodiment of the apparatus which folds.
Figure 11:
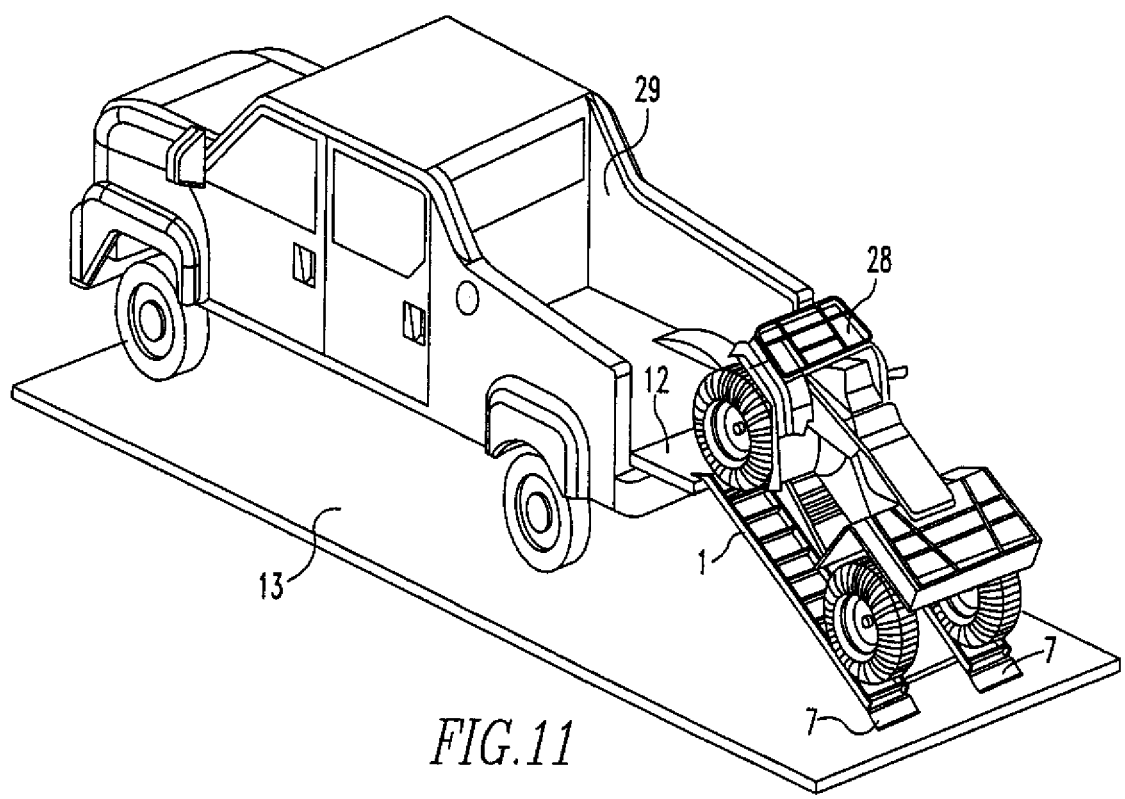
FIG. 11 is a perspective overhead view of a vehicle being wheeled onto a truck.

Ramp 25, as shown in FIG. 10, is another folding arched ramp design. This ramp 25 has a right rail 5 and a left rail 6. The traction surface of the ramp is comprised of a top mesh decking 27 and a bottom mesh decking 26. The right hinge 22 and left hinge 21 allow the ramp 25 to be folding for transportation and storage. The ramp 25 has a pivot member 11 which the bottom transition piece 7 rotates. The ramp also has a right finger 4 and left finger 3 to engage the loading surface.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for wheeling a vehicle with wheels onto a loading surface of a truck or trailer comprising:

a ramp having a right side rail and a left side rail and a center rail disposed between the right and left side rails with a plurality of bars as treads connected to the right side rail and left side rail at locations along a length of and at a top of the right and left side rails to provide traction and cross braces connected to the right side rail and the left side rail at locations along the length of the right and left side rails, the cross braces, center rail, treads with the right and left side rails defining open spaces, the cross braces and treads and center rail blocking wheels of the vehicle from falling through the spaces when the vehicle is wheeled across the ramp, the ramp supports a load of at least 1000 lbs.;

a mounting portion having a first finger connected to the right side rail and a second finger connected to the left side rail of the ramp that mounts on top of an edge of the loading surface of the truck or trailer, the ramp has the center rail attached to center braces between the mounting portion and a transition piece;

the transition piece that is curved and pivotally attaches to the ramp and contacts ground when the mounting portion is mounted to the truck or trailer, the transition piece includes a top portion which is positioned about a hollow tube to pivot about the tube, the transition piece includes a bottom portion which is arched and extends from the top portion to ground; and a pivot member about which the transition piece pivots, the pivot member includes the hollow tube, the right and left side rail each have an opening through which the tube extends to attach the tube to the right and left side rail.

2. An apparatus as described in claim 1 wherein the ramp is arched.

3. An apparatus as described in claim 1 including each side rail having an open end and an end guard capping off the open end so dirt and other material do not get lodged in the side rails.

4. A method for placing a vehicle onto a loading surface of a truck or trailer comprising:

mounting a first finger and a second finger of a mounting portion of a ramp having a right side rail attached to the first finger and a left side rail attached to the second finger on top of an edge of the loading surface of a truck or trailer and a center rail disposed between the right and left side rails with a plurality of bars as treads connected to the right side rail and left side rail at locations along a length of and at a top of the right and left side rails to provide traction and cross braces connected to the right side rail and the left side rail at locations along the length of the right and left side rails, center braces, center rail, treads with the right and left side rails defining open spaces, the cross braces and treads and center rail blocking wheels of the vehicle from falling through the spaces when the vehicle is wheeled across the ramp, the ramp supports a load of at least 1000 lbs.;

moving a transition piece attached to the ramp about a pivot member of the ramp, the pivot member including a hollow tube, so the transition piece contacts ground, the transition piece includes a top portion which is positioned about the tube to pivot about the tube, the transition piece includes a bottom portion which is arched and extends from the top portion to ground, the tube connected to the second right side rail and the second left side rail, each have an opening through which the tube extends to attach to the right and left rails, the ramp has the center rail attached to the center braces between the mounting portion and the transition piece; and wheeling the vehicle across the transition piece which is curved, up the ramp and onto the truck or trailer.

5. A method as described in claim 4 wherein the moving step includes rotating the top portion about the tube and a bottom portion which is arched and extends from the top portion to ground.

6. A method as described in claim 5 wherein the ramp is arched.

* * * * *